United States Patent [19]

Persson

[11] Patent Number: 4,925,084
[45] Date of Patent: May 15, 1990

[54] METHOD OF EXPLOSION WELDING ALLOY ALUMINIUM

[75] Inventor: Ingemar Persson, Nora, Sweden

[73] Assignee: Exploweld AB, Nora, Sweden

[21] Appl. No.: 249,961

[22] Filed: Sep. 27, 1988

[30] Foreign Application Priority Data

Sep. 28, 1987 [SE] Sweden .............................. 8703732

[51] Int. Cl.$^5$ .............................................. F42B 13/12
[52] U.S. Cl. ................................... 228/107; 228/108; 228/109; 228/190
[58] Field of Search ............... 228/2.5, 107, 108, 109, 228/208, 190, 263.13

[56] References Cited

U.S. PATENT DOCUMENTS

| | | | |
|---|---|---|---|
| 3,614,827 | 4/1969 | Knop | 228/107 |
| 4,146,164 | 3/1979 | Anderson | 228/190 |
| 4,612,259 | 9/1986 | Meda | 228/107 |
| 4,613,069 | 9/1986 | Falke | 228/208 |
| 4,747,350 | 5/1988 | Szecket | 228/108 |
| 4,756,464 | 6/1988 | Hardwick | 228/107 |

FOREIGN PATENT DOCUMENTS

| | | | |
|---|---|---|---|
| 0084884 | 4/1987 | Japan | 228/109 |
| 2182276 | 5/1987 | United Kingdom | 228/109 |

*Primary Examiner*—Nicholas P. Godici
*Assistant Examiner*—Michael William Starkweather
*Attorney, Agent, or Firm*—Nies, Kurz, Bergert & Tamburro

[57] ABSTRACT

A method of explosion welding magnesium-alloyed aluminium to high strength material. The invention is characterized in that the magnesium-alloyed aluminium material comprises base material (4) and that the base material is clad or coated with a thin cladding plate (3) consisting of the afore mentioned high strength material, in that an explosive charge (1) is caused to accelerate a drive plate (2) made of a high density material, preferably steel, which in turn is arranged to accelerate the cladding material (3) towards the base material (4), where the amplitude of the pressure generated between the cladding material and the base material is caused to take a value which is so low that the temperature in the whole of the joint surface, or substantially the whole of the joint surface, is below the boiling point of the alloying substances of the aluminium material, while bringing, at the same time, the amplitude or duration of this pressure to such a high level as to produce an impulse which is sufficient to cause the materials to weld to one another, and in that the free surface of the high-strength cladding material (3) is explosion welded, in a later stage, to a base material (6) consisting of steel or some other high strength metal.

10 Claims, 1 Drawing Sheet

METHOD OF EXPLOSION WELDING ALLOY ALUMINIUM

BACKGROUND OF THE INVENTION

The present invention relates to a method of explosion welding alloyed aluminium to high-strength materials without using a non-alloyed aluminium interlay.

Explosion welding techniques can be used to weld together practically all metallic materials. High-strength aluminium alloys containing magnesium and manganese are exceptions in this regard, however, since hitherto it has not been possible to join such alloys to any other material than non-alloyed aluminium.

For example, when manufacturing compound metal sheet or plate comprising alloyed aluminium and steel it has been necessary to use a pure aluminium interlay. Non-alloyed aluminium, however, has a low mechanical strength. The shear strength of such compound materials can therefore never be greater than 60–100 N/mm². Such compound materials are normally used as welding interlays between aluminium and steel constructions, and hence mechanical strength is of great significance.

DESCRIPTION OF THE PRIOR ART

The problem of joining alloyed aluminium directly to high-strength materials has engaged researchers throughout the world for many years, without a solution being found.

Aluminium which is alloyed with magnesium and manganese has a high mechanical strength and hardness in relation to its low density and low melting point. In accordance with the principles of explosion welding, a high degree of hardness and mechanical strength means that the coating or cladding material must be accelerated to high speeds in order for the requisite material flow to take place upon collision with the base material This means, however, that relatively high temperatures occur locally at the collision surface.

Magnesium reacts readily with the oxygen available in the form of aluminium oxides on the surface of the material, at elevated temperatures Even though the temperatures engendered due to the so-called stagnation pressure and to the reaction between magnesium and oxygen are high, the quantities of heat generated, however, are small due to the fact that the heated layer is very thin. Consequently, rapid cooling takes place and results in a thin, brittle alloying layer of magnesium-oxygen and aluminium-oxygen of amorphous structure.

Even though a compound material comprising an alloyed aluminium material should bond coherently when explosion welded, experience has shown hitherto that the joints are much too brittle for the material to be used in practice.

When explosion welding, it is endeavored to engender a turbulent flow of the colliding surface layers, so as to obtain a joint of wave-like character. This can be achieved normally by adapting the ratio between the speed of the collision front and the impact speed of the coating or cladding material.

This waviness breaks-up any brittle alloying layers that may form and therewith enables atomic bonding to take place directly between the coating material and base material over a predominant part of the total joint surface. When using conventional explosion welding techniques, however, it has been found impossible to produce a normal and uniform wave formation in the case of the combination magnesium-alloyed aluminium and high mechanical strength material such as steel.

SUMMARY OF THE INVENTION

The present invention, however, provides a method of explosion welding alloyed aluminium to strong materials.

The present invention is based on the realization that the formation of a joint of high quality is prevented when the boiling point of a starting material is exceeded By studying the properties of various materials and their ability to be explosion welded to one another, the inventor has been able to establish that metals of low boiling point, such as magnesium whose boiling point is 1097° C. and zinc whose boiling point is 907° C., result in an extremely poor joint when explosion welded to a material having a high yield point.

It has been judged that the conditions occurring when the boiling point of a starting material or workpiece is exceeded, namely large changes in volume and pressure caused by occurrent phase changes, are probably able to impede or prevent totally the generation of the turbulence which results in the wave formation in the joints between the workpieces to be joined, such wave formation being characteristic of explosion welding techniques.

The present invention thus relates to a method of explosion welding magnesium-alloyed aluminium with high strength materials, and is characterized in that the magnesium-alloyed aluminium material forms the base material and that this base material is coated or clad with a thin cladding sheet of said high-strength material; in that an explosive charge is caused to accelerate a drive plate made of a material of high density, preferably steel, which in turn is intended to accelerate the cladding material towards the base material, where the amplitude of the pressure generated between the cladding material and the base material is caused to take a value which is so low that the temperature throughout the whole of the joint surface, or substantially the whole of said surface, lies beneath the boiling point of the alloying substances of the aluminium material, while at the same time bringing the amplitude or duration of said pressure to such high levels as to produce an impulse sufficient to cause the materials to be explosion welded to one another; and in that the free surface of the high-strength cladding material is caused, in a later stage, to be explosion welded to a base material made of steel or some other high strength metal.

In all explosion welding techniques, a first workpiece, the cladding material, is slung against a second workpiece, the base material, by means of an explosive charge.

A given smallest energy impulse is required to cause the mutually facing surfaces of the workpieces to flow. This impulse is determined by the surface of the so-called pressure-time characteristic representing the shock wave exiting from the collision plane. The same impulse can be obtained at high pressure over a short time period or at low pressure under a longer time period. At such rapid processes, such as the explosion welding process, the momentary increase in temperature is determined mainly by the amplitude, i.e. the maximum pressure between the workpieces. Thus, the temperature can be lowered by lowering the amplitude and increasing the duration of the pressure. Heat is also generated by the powerful and rapid deformation undergone by the cladding material during the course of an explosion welding process, such deformation being particularly pronounced when explosion welding aluminium material.

The amount of deformation heat delivered to the joints can be reduced by selecting a thin cladding material of relatively low thermal conductivity.

Because the alloyed aluminium contains magnesium it constitutes, in accordance with the invention, the base material, since the base material is deformed to a lesser extent than the cladding material and is therefore heated to a lower temperature than would be the case if it constituted the cladding material instead.

Consequently, in accordance with the present invention, a thin cladding material of high mechanical strength and relatively low thermal conductivity is welded to an alloyed aluminium workpiece while causing the amplitude of the pressure between the workpieces to take a value which is so low that the temperature throughout the whole, or substantially the whole work surface will be lower than the boiling point of the alloying substances, while at the same time bringing the amplitude or duration of said pressure to such a high level as to produce an impulse which is sufficient to explosion weld the materials together. The free surface of the high-strength cladding material is then, in a later stage, explosion welded to a base material of steel or some other high strength metal.

Thus, a compound material of alloyed aluminium and, e.g., steel can be produced in the absence of a pure aluminium interlay. The total impulse is determined by the energy of the explosive charge. A relatively heavy drive plate can be used for the purpose of restricting the amplitude of the pressure at the collision surface and for extending the duration, in order to obtain a good explosion welding joint.

Naturally, it is necessary to adapt the total impulse and the thickness of the drive plate, and therewith its weight, to the dimensions of the cladding material and the type of cladding material used. One of normal skill in this art will experience no trouble in making this adaptation for the purpose of achieving a good explosion welding joint while, at the same time, limiting the temperature in the joint surface as before mentioned.

According to one preferred embodiment, the cladding plate has a thickness of between about 0.1 and 10 mm, preferably between 1.0 and 3 mm.

According to one preferred embodiment, the high-strength cladding plate is made of titanium or a titanium alloy.

According to another preferred embodiment, the cladding material to be welded to the alloyed aluminium material may comprise one of the metals nickel, chromium or zirconium or alloys thereof.

Experience has shown that materials which have mutually corresponding crystal structures can be more readily explosion welded to one another than materials whose crystal structures are totally different from one another.

The invention will now be exemplified with reference to a number of embodiments thereof illustrated in the accompanying drawings, in which

DESCRIPTION OF THE PREFERRED EMBODIMENTS

Figure 1:
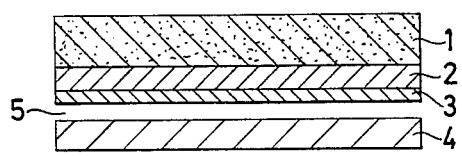
FIG. 1 illustrates an array for explosion welding a cladding material to a plate of alloyed aluminium.

In the array illustrated in FIG. 1, the reference numeral 1 identifies an explosive charge, the reference numeral 2 identifies a drive plate, which is preferably a steel plate, the reference numeral 3 identifies a thin, titanium plate and the reference numeral 4 identifies a base material comprising magnesium-alloyed aluminium. The reference numeral 5 indicates the acceleration distance between the cladding material 3 and the base material 4.

The explosive charge may comprise any suitable explosive whatsoever, such as PETN, HMX etc A blanket of, e.g., common salt may be arranged above the explosive charge, as is normal practice in explosion welding techniques The explosive charge 1 produces the smallest required impulse quantity. The heavy driving plate extends the duration of the impulse The titanium cladding material has poor thermal conductivity and the plate is made thin in order to reduce the temperature addition engendered by the deformation that takes place during the course of welding. Because the magnesium-alloyed plate constitutes the base material, said material will be deformed to a considerably less extent and consequently will produce very small thermal additions.

This method has been found to provide a wavy joint possessing excellent properties.

Figure 2:
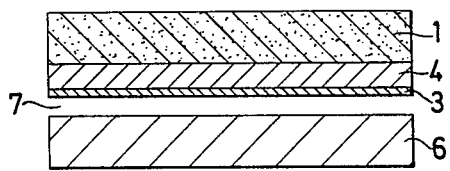
FIG. 2 illustrates an array for explosion welding a titanium/aluminium plate to a steel plate.

In order to complete the final combination with steel or some other material capable of being bonded together with titanium, the compound produced in accordance with the aforegoing, the titanium-magnesium alloyed aluminium, was used as the cladding material in the array illustrated in FIG. 2, where the reference numeral 1 identifies the requisite explosive charge, the reference numerals 3 and 4 identify titanium-magnesium alloyed aluminium compound, the reference numeral 6 identifies a base material, preferably steel, and the reference numeral 7 indicates the acceleration distance.

Figure 3:
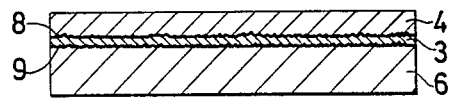
FIG. 3 illustrates schematically and in cross-section a compound material produced in accordance with the invention.

The finished product is illustrated in FIG. 3, where the reference numeral 4 indicates magnesium alloyed aluminium, similar to FIGS. 1 and 2, where the reference numeral 3 identifies titanium and the reference numeral 6 identifies steel.

The wavy joints 8, 9 are illustrated in FIG. 3.

Figure 4:
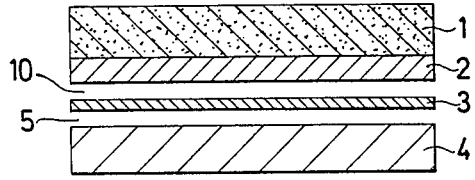
FIG. 4 illustrates an alternative array.

An alternative array is illustrated in FIG. 4, in which the same reference numerals are used as those in FIG. 1. The difference between the array of FIG. 1 and the array of FIG. 4 is that in FIG. 4 an acceleration distance 10 is present between the drive plate 2 and the titanium plate 3. Thus, in this case, when the explosive charge 1 is detonated the drive plate 2 is welded to the titanium plate 3 at the same time as the titanium plate 3 is welded to the base material 4 comprising magnesium alloyed aluminium.

Thus, in the case of this embodiment the drive plate forms part of the finished product, and hence this product corresponds to the base material 6, which is preferably steel.

An example of the inventive method applied in practice is given below:

In accordance with FIG. 1, a 10 mm thick magnesium-alloyed aluminium plate (SiS 4140) measuring 1000×2000 mm was laid on a bed of sand. A titanium plate was arranged parallel with the aluminium plate and 12 mm thereabove, and an iron plate having a thickness of 5 mm was rested on the titanium plate. The iron plate (corresponding to reference 2 in FIG. 1) was covered with a 20 mm thick layer of explosive. The explosive comprised a mixture of ammonium nitrate, diesel oil and common salt and had been adapted and tested to detonate at a rate of 2400 m/s. The explosive layer was covered with a blanketing layer of common salt to a thickness of 50 mm.

Detonation was initiated with the aid of a detonator cap number 8 and an initiating charge comprising 10 g plastic explosives and located on the short side of the main explosive charge. A bond was obtained over the whole surface and the joint had a pronounced wave shape. Subsequent to aligning the bonded plate material, the material was again rigged-up with the titanium side facing downwards (as in FIG. 2) at a distance from and parallel with a 25 mm thick steel plate resting on a bed of sand. A 25 mm thick layer of explosive substance of the same quality as that used in the aforedescribed first stage was placed on top of the aluminium plate. A similar blanketing layer was used and initiation of the main explosive was effected in a manner similar to that afore described.

The result was a wave-shaped bond between titanium and steel, such as to obtain a magnesium alloyed aluminium-titanium-steel compound.

Shear tests showed that there was very little variation in joint strength between the compound material, and was between 200 N/mm$^2$–230 N/mm$^2$.

It is obvious from this that the present invention solves the problem mentioned in the introduction. Thus, the present invention makes it possible to produce a compound material comprising magnesium-alloyed aluminium and steel in the absence of a low-strength interlay.

It will also be understood that the present invention is not restricted to the materials recited in the aforedescribed exemplifying embodiment, and that the invention embraces a method of joining all types of material to alloyed aluminium.

The afore described embodiments are therefore not to be considered restrictive of the present invention, since they can be modified within the scope of the following claims.

I claim:

1. A method of explosion welding magnesium-alloyed aluminium and high strength materials to form a high-quality, high strength joinder, wherein the magnesium-alloyed aluminium material forms a first base material and that said base material is clad with a thin cladding plate consisting of a high strength material; the method steps being that an explosive charge is caused to accelerate a drive plate consisting of a high density, high strength material, which in turn engages and accelerates the cladding material towards and into engagement with the first base material, resulting in the amplitude of pressure generated between the cladding material and the first base material having a value which is so low that the temperature in the jointing surface between the cladding plate and the first base material is below the boiling point of the alloying substances of the alloying material in the alloyed aluminium, and also assuring that the amplitude of said pressure is brought to a high value, of sufficient duration, to produce an impulse which will cause the cladding plate and the first base material to be explosion welded to one another; and wherein the free surface of the high-strength cladding sheet of the explosion welded joinder of the cladding plate and the first base material is caused, by a step of explosion welding, to be similarly explosion welded to a high strength metal material which becomes a second base material.

2. A method according to claim 1, wherein the high strength cladding plate consists of a titanium alloy.

3. A method according to claim 1, wherein the high strength cladding plate is one of the metals selected from the group consisting of nickel, chromium, zirconium and alloys thereof.

4. A method according to claim 1, wherein the cladding plate has a thickness in the range from about 0.1 mm to 10 mm.

5. A method of explosion welding as defined in claim 1, wherein the second base material is steel.

6. A method of explosion welding as defined in claim 5, wherein the drive plate is made from steel and is the second base material.

7. A method according to claim 1, wherein said high strength cladding plate consists of titanium.

8. A method according to claim 4, wherein the cladding plate has a thickness in the range of from 1.0 mm. to 3.0 mm.

9. A method according to claim 1 wherein said explosive charge, drive plate and cladding plate are in a layered and engaged combination and the cladding plate is spaced-apart from said first base material whereby when said explosive charge is exploded, it accelerates said combined drive plate and cladding plate toward and into engagement with said first base material thereby resulting in an explosion welded joinder of the cladding plate with said first base material and said drive plate which constitutes said second base material.

10. A method according to claim 1 wherein said explosive charge and drive plate combination is spaced-apart from said cladding plate and said cladding plate is spaced-apart from said first base material whereby when said explosive charge is exploded, it accelerates said drive plate toward and into engagement with the cladding plate and thereby accelerates the combined drive plate and cladding plate toward and into engagement with said first base material thereby resulting in an explosion welded joinder of the cladding plate with said first base material and said drive plate which constitutes said second base material.

* * * * *